(12) United States Patent
Knight

(10) Patent No.: US 6,749,131 B2
(45) Date of Patent: Jun. 15, 2004

(54) SPRAY APPARATUS

(76) Inventor: Brian George Knight, Knight Farm Machinery, Wireless Hill, South Luffenham, Oakham, Rutland (GB), LE15 8NF ( * ) Notice: Subject to any disclaimer, the term of this patent is extended or adjusted under 35 U.S.C. 154(b) by 0 days.

(21) Appl. No.: 10/276,949
(22) PCT Filed: May 16, 2001
(86) PCT No.: PCT/GB01/02147
§ 371 (c)(1), (2), (4) Date: Apr. 29, 2003
(87) PCT Pub. No.: WO01/87493
PCT Pub. Date: Nov. 22, 2001

(65) Prior Publication Data
US 2003/0164414 A1 Sep. 4, 2003

(51) Int. Cl.⁷ .................................................. B05B 9/00
(52) U.S. Cl. ....................... 239/127; 239/124; 239/125; 239/303; 239/310; 239/318
(58) Field of Search ................................ 239/124, 125, 239/127, 302, 310, 318, 146

(56) References Cited

U.S. PATENT DOCUMENTS 4,653,532 A 3/1987 Powers
4,697,739 A * 10/1987 McCracken et al. ........ 239/127
4,714,196 A * 12/1987 McEachern et al. ........ 239/127
5,180,487 A * 1/1993 Saito et al. .............. 210/198.2

FOREIGN PATENT DOCUMENTS

| FR | 2232174 | 12/1974 |
| FR | 2516348 | 5/1983 |
| GB | 916025 | 1/1963 |
| WO | WO89/10050 | 11/1989 |
| WO | WO96/31118 | 10/1996 |

* cited by examiner

Primary Examiner—Robin O. Evans
(74) Attorney, Agent, or Firm—Towsend and Towsend and Crew LLP

(57) ABSTRACT

Spray apparatus comprising a spray carrier or liquid reservoir (1), a loop circuit, a first pump (2) for feeding spray liquid from the liquid reservoir (1) to the loop circuit (A, B, C, D), a spray chemical reservoir (5), chemical injection means for injecting spray chemical from the spray chemical reservoir (5) into the loop circuit (A, B, C, D), a spray nozzle (6), a valve (20) selectively connecting the spray nozzle (6) to the loop circuit (A, B, C, D), and a second pump (4) in the loop circuit (A, B, C, D) for continuously circulating spray liquid and spray chemical in the loop circuit (A, B, C, D).

7 Claims, 3 Drawing Sheets

SPRAY APPARATUS

TECHNICAL FIELD

The invention relates to spray apparatus and more particularly to injected liquid chemical spray apparatus for use in agriculture or horticulture.

BACKGROUND ART

As an aid to precision farming it is known to provide chemical spray apparatus arranged to vary the rate at which a desired chemical is applied (for example according to local conditions or the ground speed of the spray apparatus) by injecting the chemical directly into the spray carrier or liquid e.g. water shortly before it is applied. In this the volume of spray carrier or liquid sprayed remains substantially constant in terms of volume per unit area and only the concentration of the sprayed chemical in the spray carried or liquid is varied.

It is known that chemical injection systems may operate with high or low pressure injection pumps. A high pressure injection pump can inject chemical close to the spray nozzle as it has sufficiently high pressure to overcome the pressure of the pumped water. Unfortunately, however, this makes calibration of the injection system difficult as any change in the back pressure of the system affects the output of the injection pump. Low pressure injection injects chemical before the sprayer's main pump where the pressure remains virtually atmospheric. This allows accurate calibration of the amount of chemical mixed with the water but is slower acting than the high pressure injection since the chemical is injected a significant distance from the spray nozzle.

International patent application WO99/39834 provides spray apparatus of the kind in which chemical to be sprayed is injected into spray carrier or liquid before the mixture of liquid and chemical is sprayed, comprising a closed loop circulating system having a pump with an inlet and an outlet, a loop line connecting the pump inlet and outlet, a spray nozzle connected to the loop line downstream of the pump via a spray line, a spray liquid inlet connected to the loop line upstream of the pump and a chemical injection system connected to the loop line upstream of the pump, a venturi device having an inlet and an outlet in the loop line, and having a suction or side port, a return line connection to the spray line at a position adjacent to the spray nozzle and connection to the suction port of the venturi device, an agitation line connected between the loop line downstream of the venturi device and the spray line adjacent the spray nozzle and valve means in the spray line directing liquid flow to the spray nozzle to cause reverse flow through the agitation line past the spray nozzle and through the return line An object of the present invention is to provide an arrangement which provides the advantages of pressure injection of the chemical whilst providing fast response between a decision to apply a chemical or change its application rate and the required change at the spray nozzle.

DISCLOSURE OF INVENTION

According to the invention, there is provided spray apparatus comprising a spray carrier or liquid reservoir, a loop circuit, a first pump for feeding spray liquid from the liquid reservoir to the loop circuit, a spray chemical reservoir, chemical injection means for injecting spray chemical from the spray chemical reservoir into the loop circuit, a spray nozzle, a valve selectively connecting the spray nozzle to the loop circuit, and a second pump in the loop circuit for continuously circulating spray liquid and spray chemical in the loop circuit.

Preferably at least one one-way valve is provided in the loop circuit to ensure liquid flow in one direction only.

The second pump may be positioned in the loop circuit to receive spray liquid directly from the first pump.

The valve selectively connecting the spray nozzle to the loop circuit may be integral with the spray nozzle assembly or alternatively other valve means may be employed, e.g. a conventional boom control valve. In this case the loop circuit may be divided into first and second loops controlled by a boom control valve in one of the loops which also includes the spray nozzle. A part of the two loops including the pump and the chemical injection means, may be common.

From another aspect the invention is an agricultural or horticultural spray vehicle comprising spray apparatus as described above.

BRIEF DESCRIPTION OF DRAWINGS

The invention is diagrammatically illustrated by way of example in the accompanying drawings in which.

BEST MODES FOR CARRYING OUT THE INVENTION

Figure 1:
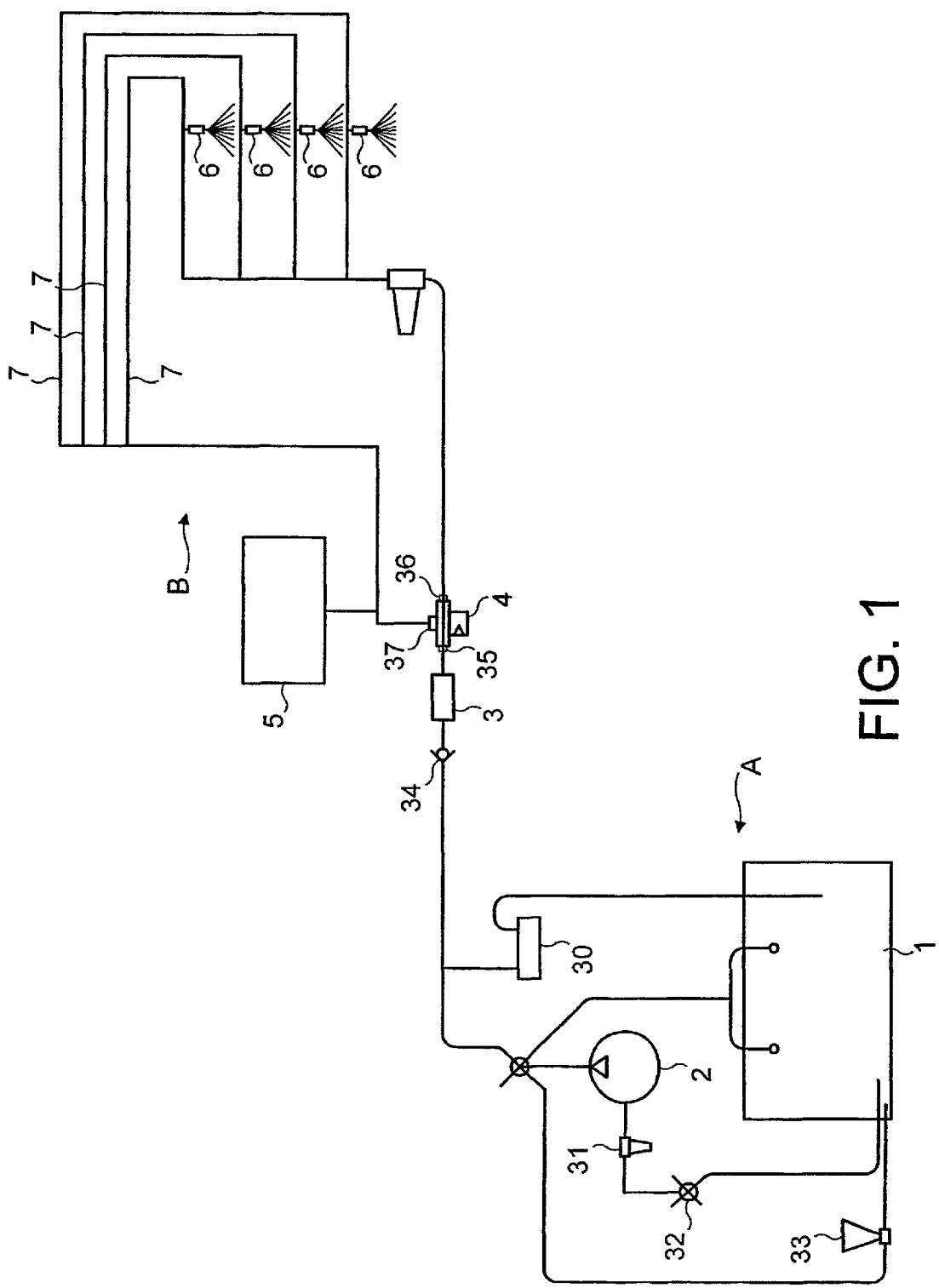
FIG. 1 is a circuit or flow diagram of an agricultural or horticultural spray apparatus.

In the drawings there is shown agricultural spray apparatus generally of the kind described in my patent application WO99/39834, which is intended for use where the chemical to be applied is maintained in concentrated form until immediately before it is to be applied and is only injected into water or other spray liquid or carrier at the last moment before spraying so that there is no requirement for batch mixing of the spray chemical and spray liquid and thus minimum wasting of chemical and reduced risk of pollution.

In the present invention in FIG. 1 the spray apparatus comprises a pair of spray liquid flow loops A and B respectively, the loop A being generally conventional and comprising a tank 1 for spray liquid, usually water, a pressure regulator 30, a shut-off valve 32, a conventional chemical filling hopper 33 and a pump 2 for drawing spray liquid from the tank 1 and for returning it to the tank as and when required.

The loop B is connected to the loop A via a one-way valve 34 to receive spray liquid therefrom at a flow sensor 3 which feeds a second pump 4 provided in the loop B to maintain continuous liquid circulation in the loop B. The loop B comprises a parallel series of spray lines 7 connected to spray nozzles 6, the spray nozzles being of the kind having integral flow control valves, and a chemical injection system 5. Pump 4 is a three-port pump having an inlet 35, an outlet 36 and a third port 37 at which a depression is created to assist chemical injection into the third port when the spray liquid or carrier is being forced through the pump from the inlet to the outlet.

Thus in operation during spraying, spray liquid is supplied to the loop B from the loop A via the pump 2 to replenish liquid sprayed from the spray nozzles 6 and chemical is injected into the loop B as required. When spraying ceases, liquid circulation in the loop B is maintained to prevent precipitation or settling of solids in the spray chemical, by the pump 4.

Figure 2:
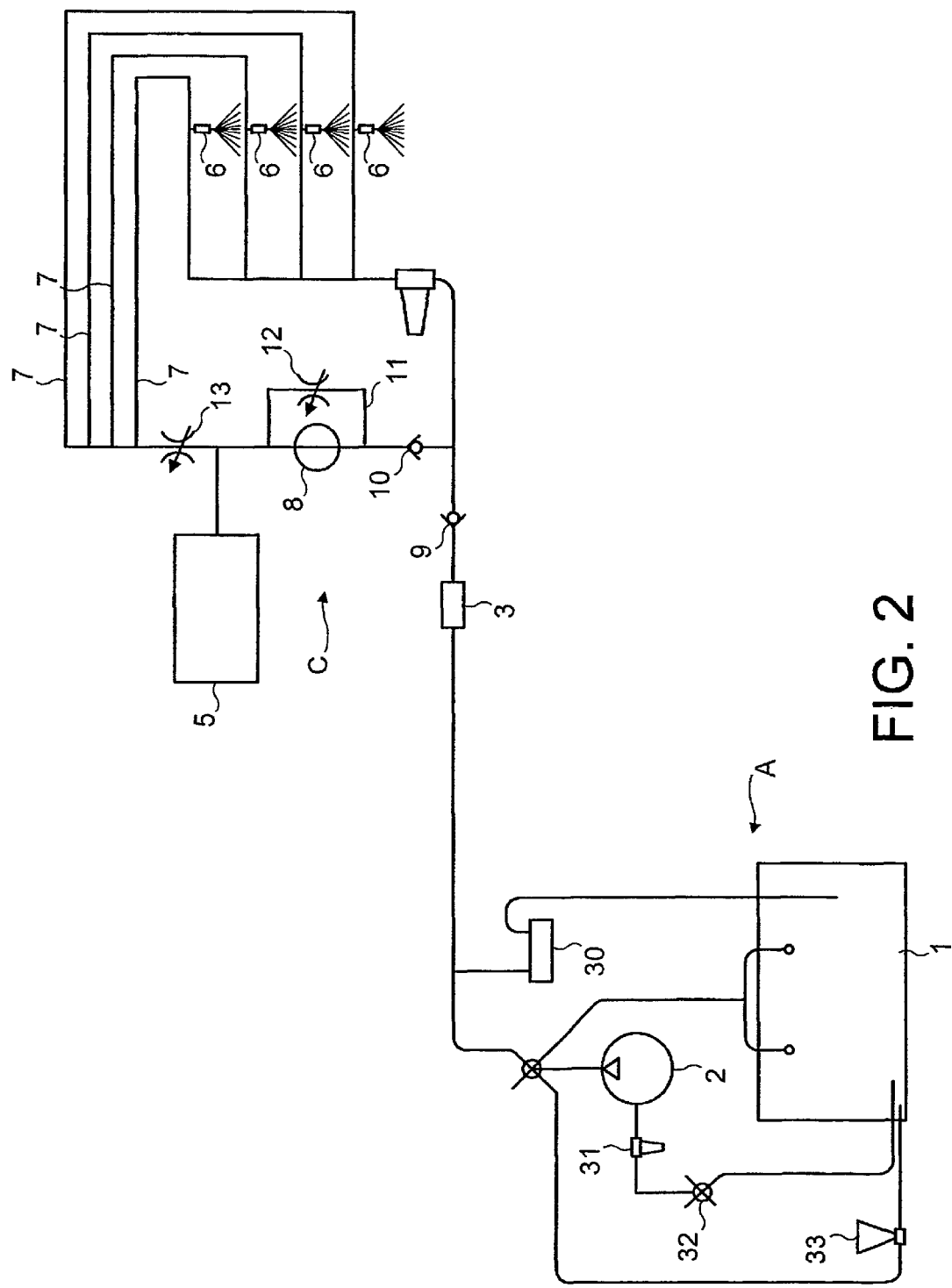
FIG. 2 is a circuit or flow diagram of a modified arrangement of spray apparatus.

In FIG. 2 there is shown spray apparatus where the loop B of FIG. 1 is replaced by a loop C which is intended to be fed with spray liquid from a circuit such as is exemplified by loop A in FIG. 1. Loop C is generally similar to that of loop B but in this case a generally conventional pump 8 having only an inlet and an outlet maintains continuous flow in the loop C as described above for loop B and one way valves 9 and 10 maintain the desired direction of flow in the loop C and prevent backflow into the loop A. Flow and pressure in the loop C is adjusted by a bypass 11 which short-circuits the pump 8 in the loop C and which is controlled by a pressure flow control valve 12. A vacuum control valve 13 is positioned in the loop C immediately upstream of the chemical injection system 5.

Figure 3:
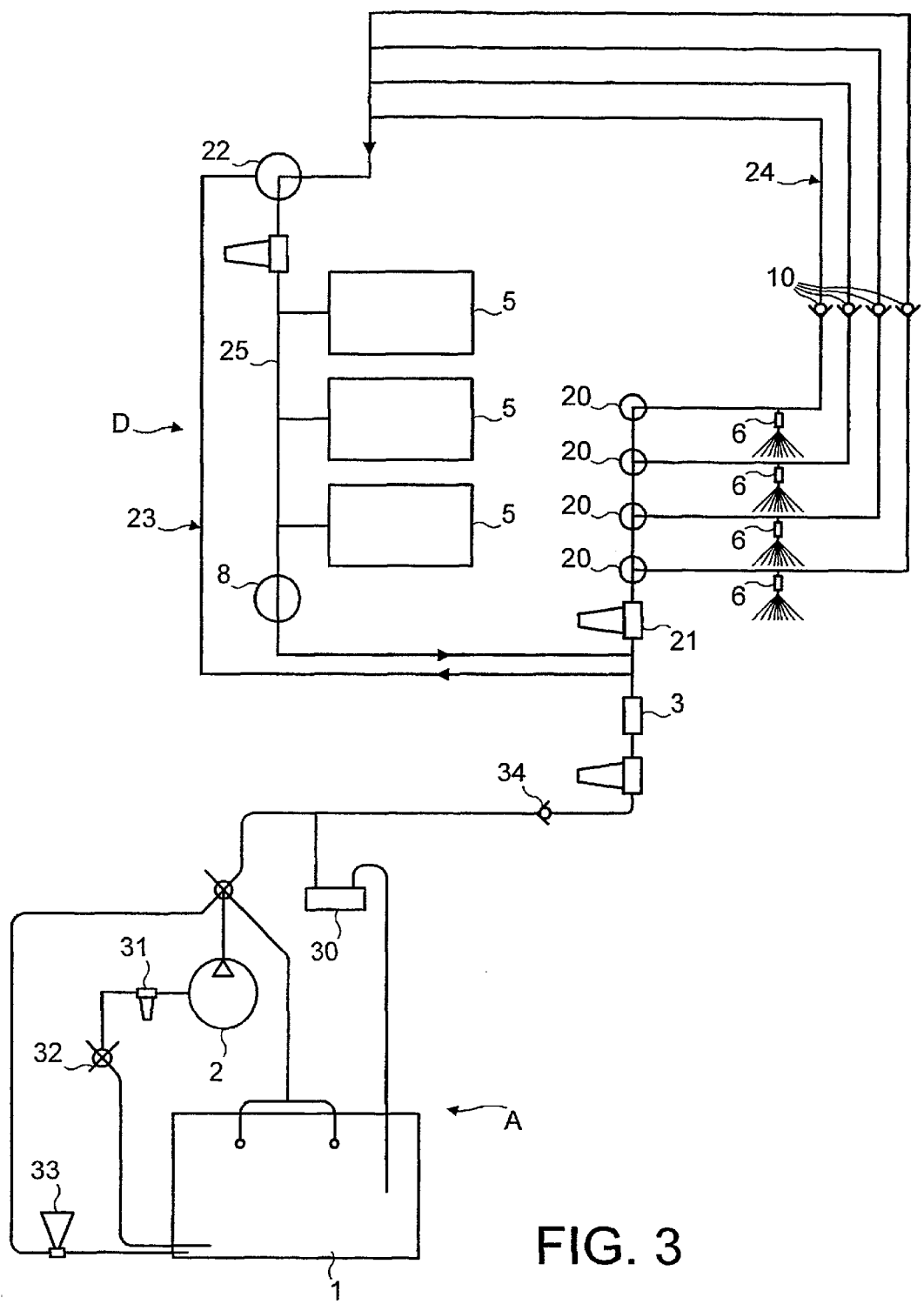
FIG. 3 is a circuit diagram generally similar to that of FIG. 1 of a further modified arrangement of spray apparatus.

FIG. 3 shows a circuit or flow diagram of agricultural or horticultural spray apparatus generally similar to that of FIGS. 1 and 2 but in which the flow control valves integral with the spray nozzles 6 are replaced by generally conventional boom control valves 20. It will be noted that the flow loop D equivalent to the loop B of FIG. 1 or loop C of FIG. 2 comprises two loop parts 23, 24 with a common part 25 including the circulating pump 8 and three chemical injection pumps 5. The boom control valves 20 are situated immediately upstream of the spray nozzles 6 in loop part 24, and the other loop part 23 forms a by-pass when the spraying is stopped by operation of the boom control valves 20, in which case spray liquid is diverted by a three way valve 22 at one end of the common part 25 so that circulation continues in loop part 23 when spraying is not occurring.

It will be noted that the embodiment of FIG. 3 includes a generally conventional spray liquid mixing chamber 21 in the loop part 24.

INDUSTRIAL APPLICABILITY

The invention thus provides both the benefits of chemical injection and of continuous agitation in the spray lines in an agricultural or horticultural sprayer.

An important advantage of this system is the speed at which the dilution of the product at the nozzle can be changed. This can happen even when the sprayer is spraying. When the system switches on a pump during spraying, the new dilution arrives at all spray nozzles much quicker than with a conventional system. Conventionally the product can only be replaced as it is sprayed from the nozzles. This means the last nozzle on the line of a conventional sprayer is slow to respond to any change.

What is claimed is:

1. Spray apparatus comprising a spray carrier or liquid reservoir, a loop circuit, a first pump for feeding spray liquid from the liquid reservoir to the loop circuit, a spray chemical reservoir, chemical injection means for injecting spray chemical from the spray chemical reservoir into the loop circuit, a spray line in the loop circuit, a spray nozzle connected to the spray line, a valve selectively connecting the spray nozzle to the loop circuit, and a second pump in the loop circuit for continuously circulating spray liquid and spray chemical in the loop circuit.

2. Spray apparatus according to claim 1, comprising at least one one-way valve in the loop circuit to ensure liquid flow in one direction only.

3. Spray apparatus according to claim 1, wherein the second pump is positioned in the loop circuit to receive spray liquid directly from the first pump.

4. Spray apparatus according to claim 1, wherein the valve selectively connecting the spray nozzle to the loop circuit is integral with the spray nozzle assembly.

5. Spray apparatus according to claim 1, comprising a generally conventional boom control valve, and wherein the loop circuit is divided into first and second loops controlled by the boom control valve in one of the loops which also includes the spray nozzle.

6. Spray apparatus according to claim 5, wherein a part of the two loops including the pump and the chemical injection means is common.

7. An agricultural or horticultural spray vehicle comprising spray apparatus as claimed in claim 1.

* * * * *